United States Patent [19]

Van Hal et al.

[11] Patent Number: 5,236,876

[45] Date of Patent: Aug. 17, 1993

[54] BODY OF CERIUM-DOPED QUARTZ GLASS

[75] Inventors: Henricus A. M. Van Hal; Renatus Aerts; Emmanuel Papanikolau, all of Eindhoven, Netherlands

[73] Assignee: U.S. Philips Corporation, New York, N.Y.

[21] Appl. No.: 734,832

[22] Filed: Jul. 24, 1991

[30] Foreign Application Priority Data

Sep. 27, 1990 [NL] Netherlands .................. 9002107

[51] Int. Cl.$^5$ ................... C03C 3/06; C03C 3/095
[52] U.S. Cl. ............................ 501/64; 501/12; 501/54; 501/152; 65/32.1; 65/DIG. 1; 65/DIG. 8; 423/21.1; 428/426; 428/446
[58] Field of Search ............ 501/12, 54, 64, 152; 252/301.4 R, 301.4 F; 428/426, 432, 447; 423/21.1, 352; 264/65, 56; 65/32.1, DIG. 1, DIG. 8; 313/636

[56] References Cited

U.S. PATENT DOCUMENTS

| | | | |
|---|---|---|---|
| 3,459,673 | 8/1969 | Best et al. ........................... | 501/54 |
| 3,527,711 | 9/1970 | Barber et al. ........................ | 501/54 |
| 3,764,286 | 10/1973 | Antczak et al. ...................... | 65/134 |
| 4,361,779 | 11/1982 | van der Steen et al. ............. | 501/54 |
| 4,798,681 | 1/1989 | Oversluizen et al. ........ | 252/301.4 F |
| 4,814,105 | 3/1989 | Oversluizen et al. ........ | 252/301.4 F |

OTHER PUBLICATIONS

Chemical Abstracts, No. 154204x vol. 104, No. 18, May 5, 1986 Kh. A. Cherches et al., "Preparation of Cerium Silicates", p. 330.
Chemical Abstract No. 70771h, vol. 73, No. 14, 1970, Yu. I. Smolin et al. "Structural Types of Rare-Earth Element Diortho(pyro)silicates".

*Primary Examiner*—Mark L. Bell
*Assistant Examiner*—Michael A. Marcheschi
*Attorney, Agent, or Firm*—Norman N. Spain

[57] ABSTRACT

A body of cerium-doped quartz glass is manufactured by melting together silicon oxide and a cerium (III) silicate compound, preferably $Ce_2Si_2O_7$, in a reducing atmosphere. The invention provides a method of manufacturing said cerium-silicate compound having a tetragonal crystal structure. The quartz glass manufactured can be suitably used in a lamp envelope of UV-absorbing quartz glass, the water content in the quartz glass being less than 1 ppm.

9 Claims, 1 Drawing Sheet

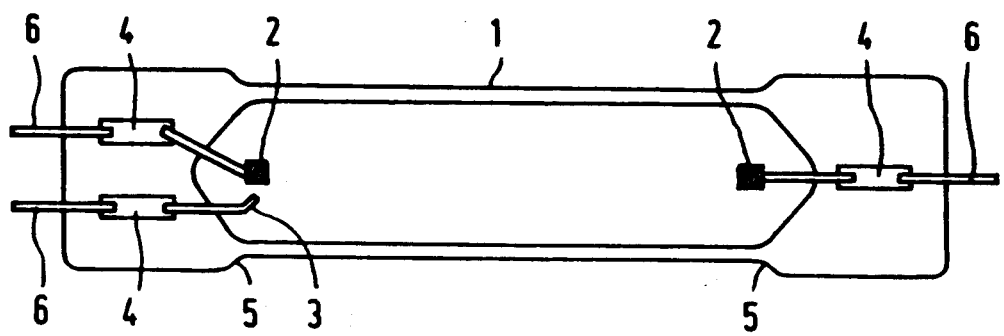

BODY OF CERIUM-DOPED QUARTZ GLASS

BACKGROUND OF THE INVENTION

The invention relates to a method of manufacturing a body of cerium-doped quartz glass by melting together silicon dioxide and a cerium compound in a reducing atmosphere.

The invention further relates to cerium silicate having the composition $Ce_2Si_2O_7$.

The invention also relates to a lamp envelope of cerium-doped quartz glass and a lamp having an envelope of UV-absorbing quartz glass.

Lamp envelopes of quartz glass are used for various types of lamps in which high temperatures occur during operation of the lamp, for example for mercury-vapor lamps and halogen incandescent lamps. In various applications it is desirable to absorb light having a short wavelength, for example UV light. This can be achieved in a simple manner by doping quartz glass with, for example, an oxide of a rare earth metal, such as cerium.

Cerium-doped quartz glass and the lamp and lamp envelope to be manufactured therefrom are described in U.S. Pat. No. 4,361,779. For doping quartz glass with cerium, in general, cerium (IV) oxide $CeO_2$ is used, see for example U.S. Pat. No. 4,798,681 in which the manufacture of luminescent quartz glass is described, this quartz glass comprising, inter alia, cerium in the form of trivalent ions. The preparation of quartz glass often takes place in a reducing (mostly hydrogen-containing) atmosphere to counteract the formation of bubbles in the finished product, see for example the above-mentioned U.S. Pat. No. 4,361,779. The use of the known method to manufacture cerium-doped quartz glass, however, leads to the formation of water as a result of the reaction:

$$2CeO_2 + H_2 \rightarrow Ce_2O_3 + H_2O$$

which causes the finished product to exhibit too high a water content. The presence of water leads to a high IR absorption and, hence, to a high temperature of the quartz glass during operation of the lamp. The water present also adversely affects the gas content of the lamp and a reaction of the water with the electrode or the filament of the lamp may lead to blackening of said lamp. These effects reduce the useful life of the lamp. Cerium (III) oxide $Ce_2O_3$ cannot be used as an alternative to the doping of quartz glass because this oxide is not stable in air, thus causing problems during doping (quantity) and mixing. Other cerium compounds, such as cerium aluminate, are not suitable when the presence of foreign metal ions in the quartz glass is not desirable.

SUMMARY OF THE INVENTION

It is an object of the invention to provide a lamp envelope of UV-absorbing quartz glass, and a lamp comprising such a lamp envelope, the lamp having a long life cycle of the lamp and exhibiting no or almost no discoloration of the quartz glass during the live of the lamp. A further object of the invention is to provide a method of manufacturing a suitable quartz glass and the materials required for the manufacture of the glass, the quartz glass having a low water content of, preferably, less than 1 ppm in parts by weight.

According to one aspect of the invention a lamp envelope of cerium-doped quartz glass is provided in which the water content is less than 1 ppm.

According to an additional aspect of the invention, a cerium-doped quartz glass is manufactured according to the method of the opening paragraph in which the cerium compound used is a cerium (III) silicate compound.

BRIEF DESCRIPTION OF THE INVENTION

The sole FIGURE of the drawing is a cross-sectional view of a mercury-vapor discharge lamp employing the quartz glass envelope of the invention.

DETAILED DESCRIPTION OF THE INVENTION

Suitable cerium (III) silicate compounds are the compounds having the compositions $Ce_2SiO_5$ and $Ce_{4.6\text{-}7}Si_3O_{13}$. By virtue of the great stability at high temperatures, the compound having the composition $Ce_2Si_2O_7$ is particularly suitable. The latter compound is described in literature, only a material having an orthorhombic structure being known (type G), see an article by J. Felsche in Journal of the Less-Common Metals, 21 (1), pp. 1 to 14 (1970). In investigations leading to the present invention it has been found that a suitable, novel cerium-silicate compound having the composition $Ce_2Si_2O_7$ and a tetragonal crystal structure (type A) can be manufactured.

For the manufacture of the cerium-silicate compound, which is preferably used in the method according to the invention, silicon dioxide and cerium oxide in a very reactive form must be brought into contact at a high temperature. In accordance with an efficacious method, the cerium-silicate compound $Ce_2Si_2O_7$ is manufactured by spray drying a mixture of silicon dioxide sol and a cerium salt and heating the powder formed in the presence of oxygen, thus causing cerium salt to be dissociated while forming cerium oxide, after which the mixture is heated in a reducing atmosphere at a temperature higher than 1100° C. At a temperature exceeding the firing temperature of approximately 1500° C., the G-type crystal structure is obtained, at temperatures between 1300° and 1500° C. the product consists of a mixture of A type and G type cerium silicate $Ce_2Si_2O_7$. Below a temperature of approximately 1300° C. the novel compound having the A-type crystal structure is obtained, which compound can very suitably be used for the manufacture of cerium-doped quartz glass.

In accordance with an alternative method, the cerium-silicate compound $Ce_2Si_2O_7$ is manufactured by adding an excess of ammonium hydroxide to a mixture of a silicon dioxide sol and a cerium salt, thus forming cerium hydroxide, filtering-off the powder formed and heating it in the presence of oxygen, thereby forming cerium oxide, after which the mixture is heated in a reducing atmosphere at a temperature exceeding 1100° C.

In accordance with another suitable method, the cerium-silicate compound $Ce_2Si_2O_7$ is manufactured by converting a mixture of a silicon dioxide sol and a cerium salt in alcohol into a gel which is dried, ground and heated in the presence of oxygen, thus forming cerium oxide, after which the mixture is heated in a reducing atmosphere at a temperature exceeding 1100° C.

In accordance with the invention, the object of providing a lamp envelope of cerium-doped quartz glass and a lamp comprising such a lamp envelope of UV-absorbing quartz glass is achieved by using quartz glass which is manufactured according to the inventive method, the water content in the quartz glass being less than 1 ppm, measured in parts by weight.

The adverse effects of water in quartz glass are known per se, see U.S. Pat. No. 3,848,152, but as these effects do not relate to cerium-doped quartz glass the specific problems involved and the solutions found are not discussed or indicated.

The invention will be explained in greater detail by means of exemplary embodiments and with reference to the accompanying drawing.

Exemplary Embodiment 1

A solution of 1 mol of tetraethylorthosilicate Si-$(OC_2H_5)_4$ in 2 mol of ethanol was hydrolyzed by adding 20 ml of 2N nitric acid, thus forming a silicon dioxide sol. During said hydrolysis, a solution of cerium (III) nitrate in water was added in such a quantity that the molar ratio of Ce:Si was 1:1, and that the molar ratio of water: Si was greater than 2:1. The solution was diluted with water to an overall quantity of 3 liters to preclude the formation of a gel. The hydrolysis process was carried out at room temperature within 1 hour.

The mixture of the silicon dioxide sol and cerium nitrate was spray dried, the mixture being cooled to a temperature of 5° C. to preclude polymerization (formation of a gel) of the sol. By spray drying a voluminous, homogeneously dispersed mixture of silicon dioxide and cerium nitrate particles was obtained.

By heating the powder in air for 2 hours at a temperature of 600° C., said the cerium nitrate was dissociated, thus forming cerium dioxide.

The reactive mixture of silicon dioxide and cerium dioxide thus obtained was heated at a temperature of 1200° C. in a reducing atmosphere consisting of a mixture of 93 vol. % of nitrogen and 7 vol % of hydrogen for 5 hours. In this process, a complete conversion into cerium disilicate $Ce_2Si_2O_7$ (type A) was obtained. This material was cooled in a reducing atmosphere and ground in an agate mortar.

By means of X-ray diffraction measurements it was established that the cerium disilicate manufactured has a tetragonal structure, the crystal lattice having the following dimensions: the a-axis has a length of 0.6799 nm, the c-axis has a length of 2.4734 nm.

It is also possible to manufacture cerium disilicate $Ce_2Si_2O_7$ (type G), for which purpose the reaction in the reducing atmosphere has to be carried out at a higher temperature of, for example, 1600° C. The material thus obtained has an orthorhombic crystal structure with the following lattice constants: the a-axis has a length of 0.8772 nm, the b-axis has a length of 1.306 nm and the x-axis has a length of 0.5401 nm. For the preparation of other cerium-silicate compounds which are known per se, silicon dioxide and the cerium salt used must be mixed in the corresponding ratios.

A mixture of silicon dioxide (rock-crystal) end 0.1 mol % of cerium disilicate $Ce_2Si_2O_7$ was melted in a 100% hydrogen atmosphere in a molybdenum furnace at a temperature of 2200° C. The quartz glass thus manufactured was drawn into a tubular shape. A suitable method of manufacturing tubes of quartz glass is described in U.S. Pat. No. 3,764,286, the contents of which are hereby incorporated by reference.

The quartz glass manufactured absorbs ultraviolet light having wavelengths up to 400 nm and is completely transparent to visible light. Within the framework of the invention it is possible to add still other dopants to the quartz glass to obtain other, desired properties. Thus, titanium dioxide with europium (II) or europium (III)-oxide can be added to increase the ultraviolet absorption at wavelengths below 300 nm, which can be attained with quantities of approximately 0.01 mol %.

The water content of the quartz glass manufactured is less than 0.5 ppm, measured in parts by weight. For comparison, it is stated that when cerium dioxide is used to manufacture cerium-containing quartz glass, at otherwise equal process conditions, the quartz glass manufactured contains 200 ppm of water.

In the FIGURE a mercury-vapour discharge lamp is shown as an example of the use of the quartz glass manufactured. In said FIGURE, the lamp envelope 1 consists of quartz glass according to the invention. The lamp further comprises wound electrodes 2, an auxiliary electrode 3, metal strips 4 for the passage of current, pinch seals 5 and connection pins 6.

The quartz glass manufactured according to the invention can also suitably be used in halogen incandescent lamps and in other lamps in which a lamp vessel of quartz glass is used.

Exemplary Embodiment 2

A mixture of a silicon dioxide sol and cerium nitrate was manufactured as indicated in Exemplary embodiment 1. Instead of the spray-drying step, 1N ammonium hydroxide was added to the mixture in an excess of 5 to 10 times, so that a voluminous, finally dispersed deposit was formed which consisted of silicon dioxide and cerium (IV) hydroxide. The ammoniacal solution was filtered through filter presses and the powder was dried at 600° C. for 1 hour.

For the manufacture of quartz glass, the reactive mixture of silicon dioxide and cerium dioxide thus obtained was treated and processed in the same manner as indicated in Exemplary embodiment 1, and the results obtained were also the same.

Exemplary Embodiment 3

Polyethoxysilane (hexamer) $Si_6O_5(OC_2H_5)_{14}$ was added in a quantity of 1 mol to a mixture of 6 mol of cerium (III) nitrate and 60 mol of ethanol, after which 12 mol of water was added while stirring. The mixture was stirred for 2 hours at a temperature of 40° C. A mixture of a silicon dioxide sol and a cerium salt in alcohol was obtained. This mixture was heated to a temperature of 70° to 80° C. after which alcohol was evaporated (⅔ of the overall volume) while stirring, so that the viscosity increased and a gel was formed. The gel formed was finally ground and dried. A reactive mixture of silicon dioxide and cerium dioxide was obtained by heating in air for 2 hours at a temperature of 600° C.; for the manufacture of quartz glass said reactive mixture was treated and processed further in the same manner, and with the same results, as indicated in Exemplary embodiment 1.

Exemplary Embodiment 4

Silicon dioxide $SiO_2$ powder (average grain size 50 nm) and cerium oxide $CeO_2$ powder (average grain size 12 μm) were thoroughly mixed. The molar ratio of the elements Si and Ce in the mixture was 1.04:1. The mixture was kept at a temperature of 1350° C. for 8 hours in a reducing atmosphere consisting of 92% by volume of nitrogen and 8% by volume of hydrogen. As a result of this process, a single-phase cerium silicate of the composition $Ce_2Si_2O_7$ and having a tetragonal crystal structure was obtained.

For the manufacture of quartz glass, the material thus obtained was treated and processed in the same manner as indicated in Exemplary embodiment 1, and the results obtained were also the same.

We claim:

1. A method of manufacturing a body of cerium-doped quartz glass having a water content of less than 1 ppm by heating together a mixture of silicon dioxide and a cerium (III) silicate compound in a reducing atmosphere at a temperature exceeding 1100° C. and for a time at least sufficient to melt said mixture.

2. A method as claimed in claim 1, characterized in that the cerium III silicate compound used has the composition $Ce_2Si_2O_7$.

3. A method of claim 2 wherein the cerium (III) silicate $Ce_2Si_2O_7$ is manufactured by spray drying a mixture of a silicon dioxide sol and a cerium salt decomposable to cerium dioxide, heating the powder formed in the presence of oxygen at a temperature sufficient to decompose the cerium salt into cerium dioxide and then heating the resultant mixture of a cerium dioxide and silicon dioxide in a reducing atmosphere at a temperature exceeding 1100° C.

4. A method of claim 2 wherein the cerium (III) silicate $Ce_2Si_2O_7$ is manufactured by adding an excess of an aqueous sol of ammonium hydroxide to a mixture of a silicon dioxide sol and a cerium salt decomposable to cerium dioxide thereby forming a precipitate of silicon dioxide and cerium hydroxide, filtering off the precipitate of silicon dioxide and cerium hydroxide, and heating the precipitate in oxygen at a temperature at least sufficient to decompose the cerium hydroxide to cerium dioxide and then heating the resultant mixture in a reducing atmosphere at a temperature exceeding 1100° C.

5. A method of claim 2 wherein the cerium (III) silicate compound is manufactured by heating a mixture of a silicon dioxide sol and a cerium salt decomposable to cerium dioxide to convert said mixture to a gel, drying said gel, grinding said gel to form a powder, and heating said powder in the presence of oxygen at a temperature sufficient to decompose said cerium salt to cerium dioxide and then heating said powder in a reducing atmosphere at a temperature exceeding 1100° C.

6. The method of claim 3 in which the mixture is heated in the reducing atmosphere at a temperature below 1300° C. and the cerium silicate produced has the composition $Ce_2Si_2O_7$ and a tetragonal crystal structure.

7. The method of claim 4 in which the mixture is heated in the reducing atmosphere at a temperature below 1300° C. and the cerium silicate produced has the composition $Ce_2Si_2O_7$ and a tetragonal crystal structure.

8. The method of claim 5, in which the mixture is heated in the reducing atmosphere at a temperature below 1300° C. and the cerium silicate produced has the composition $Ce_2Si_2O_7$ and a tetragonal crystal structure.

9. Cerium silicate having the composition $Ce_2Si_2O_7$ and a tetragonal crystal structure.

* * * * *